United States Patent
Lin

(10) Patent No.: US 10,771,133 B2
(45) Date of Patent: Sep. 8, 2020

(54) SIGNAL TRANSMISSION METHOD AND APPARATUS

(71) Applicant: GUANGDONG OPPO MOBILE TELECOMMUNICATIONS CORP., LTD., Dongguan, Guangdong (CN)

(72) Inventor: Yanan Lin, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/478,471

(22) PCT Filed: Jan. 17, 2017

(86) PCT No.: PCT/CN2017/071410
§ 371 (c)(1),
(2) Date: Jul. 16, 2019

(87) PCT Pub. No.: WO2018/132944
PCT Pub. Date: Jul. 26, 2018

(65) Prior Publication Data
US 2019/0386723 A1    Dec. 19, 2019

(51) Int. Cl.
*H04B 7/0456* (2017.01)
*H04L 5/00* (2006.01)

(52) U.S. Cl.
CPC ......... *H04B 7/0478* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 8,948,297 B2 * | 2/2015 | Zhang | H04B 7/0456 375/296 |
| 10,044,489 B2 * | 8/2018 | Pajukoski | H04L 5/0032 |
| 10,555,365 B2 * | 2/2020 | Nogami | H04W 72/042 |
| 10,587,366 B2 * | 3/2020 | Chervyakov | H04L 1/0069 |
| 2009/0046569 A1 * | 2/2009 | Chen | H04L 5/0007 370/203 |

(Continued)

FOREIGN PATENT DOCUMENTS

| | | | | |
|---|---|---|---|---|
| AU | 2017394106 A1 * | 8/2019 | | H04L 5/0048 |
| CA | 3050335 A1 * | 7/2018 | | H04B 7/0478 |

(Continued)

OTHER PUBLICATIONS

WIPO, ISR for PCT/CN2017/071410, dated Oct. 11, 2017.

(Continued)

*Primary Examiner* — Berhanu Tadese
(74) *Attorney, Agent, or Firm* — Hodgson Russ LLP

(57) ABSTRACT

A signal transmission method and apparatus, capable of determining suitable precoding granularity to enable a balance between a precoding gain and channel estimation performance. The method comprises: a first apparatus determining a first numerology employed for transmitting a signal; the first apparatus determining, according to the first numerology, first precoding granularity employed for transmitting the signal; and using the first precoding granularity to transmit the signal between the first apparatus and a second apparatus.

15 Claims, 3 Drawing Sheets

(56) References Cited

U.S. PATENT DOCUMENTS

| | | | |
|---|---|---|---|
| 2010/0111018 A1* | 5/2010 | Chang | H04B 7/15585 370/329 |
| 2011/0028156 A1* | 2/2011 | Zhu | H04B 7/0417 455/450 |
| 2011/0170498 A1* | 7/2011 | Liu | H04B 7/0478 370/329 |
| 2011/0255483 A1* | 10/2011 | Xu | H04L 25/0232 370/329 |
| 2012/0008587 A1* | 1/2012 | Lee | H04L 1/06 370/329 |
| 2012/0099544 A1* | 4/2012 | Pajukoski | H04J 11/0026 370/329 |
| 2012/0106432 A1* | 5/2012 | Lee | H04B 7/15528 370/315 |
| 2012/0122495 A1* | 5/2012 | Weng | H04W 68/025 455/458 |
| 2012/0140851 A1* | 6/2012 | Zhang | H04B 7/0456 375/296 |
| 2013/0077660 A1* | 3/2013 | Ko | H04B 7/0473 375/219 |
| 2013/0129018 A1* | 5/2013 | Ko | H04B 7/065 375/296 |
| 2013/0201912 A1* | 8/2013 | Sheng | H04B 7/0634 370/328 |
| 2014/0204782 A1* | 7/2014 | Geirhofer | H04L 1/0023 370/252 |
| 2014/0348012 A1* | 11/2014 | Wu | H04L 5/0094 370/252 |
| 2015/0078271 A1* | 3/2015 | Kim | H04L 5/0051 370/329 |
| 2016/0021642 A1* | 1/2016 | Kim | H04L 5/0039 370/329 |
| 2016/0119936 A1* | 4/2016 | Kim | H04J 11/0053 370/329 |
| 2016/0135194 A1* | 5/2016 | Kim | H04L 1/0026 370/329 |
| 2016/0227520 A1* | 8/2016 | Davydov | H04L 25/0228 |
| 2016/0249355 A1* | 8/2016 | Chae | H04L 5/0091 |
| 2016/0262165 A1* | 9/2016 | Lee | H04W 28/04 |
| 2016/0302174 A1* | 10/2016 | Chatterjee | H04W 72/06 |
| 2017/0006636 A1* | 1/2017 | Li | H04W 74/0816 |
| 2017/0188371 A1* | 6/2017 | Kim | H04W 52/243 |
| 2017/0201968 A1* | 7/2017 | Nam | H04W 72/042 |
| 2017/0289953 A1* | 10/2017 | Chae | G01S 1/20 |
| 2018/0049169 A1* | 2/2018 | Lin | H04L 5/0051 |
| 2018/0092002 A1* | 3/2018 | Manolakos | H04W 72/0453 |
| 2018/0199341 A1* | 7/2018 | Baldemair | H04L 5/0028 |
| 2018/0241508 A1* | 8/2018 | Chervyakov | H04L 25/0224 |
| 2018/0254867 A1* | 9/2018 | Kim | H04L 5/0051 |
| 2018/0288745 A1* | 10/2018 | Davydov | H04L 5/0044 |
| 2018/0310300 A1* | 10/2018 | Lin | H04L 5/0051 |
| 2018/0324770 A1* | 11/2018 | Nogami | H04L 5/005 |
| 2019/0052354 A1* | 2/2019 | Roessel | H04L 27/2607 |
| 2019/0053318 A1* | 2/2019 | Nogami | H04W 76/27 |
| 2019/0082448 A1* | 3/2019 | Nogami | H04W 72/1263 |
| 2019/0116007 A1* | 4/2019 | Yi | H04L 27/2607 |
| 2019/0149257 A1* | 5/2019 | Jiang | H04J 13/0003 370/342 |
| 2019/0165894 A1* | 5/2019 | Choi | H04L 1/1812 |
| 2019/0166569 A1* | 5/2019 | Wu | H04L 41/0803 |
| 2019/0174440 A1* | 6/2019 | Kwak | H04W 56/0015 |
| 2019/0199407 A1* | 6/2019 | Tang | H04L 5/0023 |
| 2019/0223163 A1* | 7/2019 | Ko | H04W 56/00 |
| 2019/0268089 A1* | 8/2019 | Fu | H04W 72/042 |
| 2019/0349943 A1* | 11/2019 | Wu | H04W 72/042 |
| 2019/0386723 A1* | 12/2019 | Lin | H04L 5/0048 |
| 2019/0394001 A1* | 12/2019 | Sano | H04W 16/28 |
| 2020/0052866 A1* | 2/2020 | Manolakos | H04L 5/0023 |
| 2020/0052939 A1* | 2/2020 | Xiong | H04L 5/0048 |
| 2020/0053781 A1* | 2/2020 | Pan | H04W 72/005 |
| 2020/0059961 A1* | 2/2020 | Do | H04W 72/02 |

FOREIGN PATENT DOCUMENTS

| | | | |
|---|---|---|---|
| CN | 101931442 | 12/2010 | |
| CN | 102379091 | 3/2012 | |
| CN | 102379091 A * | 3/2012 | H04L 1/0041 |
| CN | 102638337 | 8/2012 | |
| CN | 103905101 | 7/2014 | |
| CN | 104112877 A * | 10/2014 | H04W 74/006 |
| CN | 104113877 | 10/2014 | |
| CN | 110050412 A * | 7/2019 | H04L 25/022 |
| EP | 2775653 | 9/2014 | |
| EP | 2775653 A1 * | 9/2014 | H04L 5/0007 |
| EP | 3457782 | 3/2019 | |
| EP | 3457782 A1 * | 3/2019 | H04W 72/04 |
| EP | 3570452 A1 * | 11/2019 | H04L 25/0204 |
| RU | 2559201 | 8/2015 | |
| RU | 2559201 C2 * | 8/2015 | H04W 74/006 |
| WO | 2016209139 | 12/2016 | |
| WO | WO-2016209139 A1 * | 12/2016 | H04L 5/0039 |
| WO | 2018082640 | 5/2018 | |
| WO | WO-2018132944 A1 * | 7/2018 | H04L 5/0048 |
| WO | WO-2018171774 A1 * | 9/2018 | H04L 25/0204 |

OTHER PUBLICATIONS

Samsung, "Preceding granularity of NR DMRS," 3GPP TSG RAN WG1 Ad-hoc Meeting, R1-1700930, Jan. 2017, 6 pages.

EPO, Office Action for EP Application No. 17892423.9, dated Nov. 26, 2019.

CNIPA, First Office Action for CN Application No. 201780075576. 6, dated May 15, 2020.

FIIP, Office Action for RU Application No. 2019125861/07, dated Mar. 12, 2020.

* cited by examiner

SIGNAL TRANSMISSION METHOD AND APPARATUS

CROSS-REFERENCE TO RELATED APPLICATION

This application is a U.S. national phase application of International Application No. PCT/CN2017/071410, filed Jan. 17, 2017, the entire disclosure of which is incorporated herein by reference.

TECHNICAL FIELD

The present application relates to the field of communication, and more particularly, to a method of transmitting a signal and a device.

BACKGROUND

In communication systems, when transmitting a downlink signal, a base station performs the same precoding processing on the downlink signals in a frequency-domain resource corresponding to a precoding granularity, and the terminal device receives the downlink signal assuming that, in the frequency-domain resource corresponding to the precoding granularity, the same precoding processing is performed on the signal transmission.

For example, when the terminal device performs a channel estimation based on a Demodulation Reference Signal (DMRS), a frequency-domain channel interpolation may be performed on the channel estimation obtained from the DMRS in a frequency-domain resource on which it is assumed that the same precoding processing is performed, thereby improving performance of the estimation. The larger the precoding granularity, the larger the frequency-domain bandwidth that can be interpolated, and the higher the accuracy of channel estimation. However, since a channel is varied in the frequency domain, using a larger precoding granularity results in a lower degree of matching between the precoding and the channel, thereby limiting precoding gain. Therefore, the value of the precoding granularity is a compromise between the precoding gain and the performance of channel estimation.

In future wireless communication systems, how to determine a reasonable precoding granularity is an urgent problem to be solved.

SUMMARY

Embodiments of the present application provide a method and a device for transmitting a signal.

In a first aspect, there is provided a method of transmitting a signal, comprising:
determining, by a first device, a first numerology used to transmit a signal;
determining, by the first device, a first precoding granularity which is used to transmit the signal based on the first numerology;
performing, by the first device, transmission of the signal with a second device using the first precoding granularity.

In a second aspect, there is provided a device for transmitting a signal, wherein the device for transmitting a signal may comprise units for performing a method in the first aspect or any optional implementation thereof.

In a third aspect, there is provided a device for transmitting a signal, wherein the device for transmitting a signal may include a memory and a processor, wherein the memory stores instructions, and the processor is configured to invoke instructions stored in the memory to perform a method in the first aspect or any optional implementation thereof.

In a fourth aspect, there is provided a computer-readable medium used for storing a program code to be executed by a terminal device, wherein the program code comprises instructions for performing methods in the first aspect or possible implementations thereof.

In a fifth aspect, there is provided a system-on-chip comprising an input interface, an output interface, a processor and a memory, wherein the processor is configured to execute a code in the memory and to implement methods in the first aspect or possible implementations thereof when the code is executed.

BRIEF DESCRIPTION OF THE DRAWINGS

Accompanying drawings used to describe embodiments or the prior art will be introduced briefly below in order to illustrate the technical solutions of embodiments of the present application more clearly. Obviously, the accompanying drawings in the following description are merely for some embodiments of the present application, and other drawings can also be obtained based on these accompanying drawings by a person having ordinary skill in the art without creative efforts.

DETAILED DESCRIPTION

The technical solutions in embodiments of the present application will be described in the following in combination with accompanying drawings of embodiments of the present application. Obviously, the described embodiments are a part of embodiments of the present application, but not all of them. All other embodiments obtained by a person of ordinary skill in the art based on embodiments of the present application without creative work are within the scope of the present application.

Embodiments of the present application can be applied in various kinds of communication systems such as Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or a future 5G system, and so on.

Figure 1:
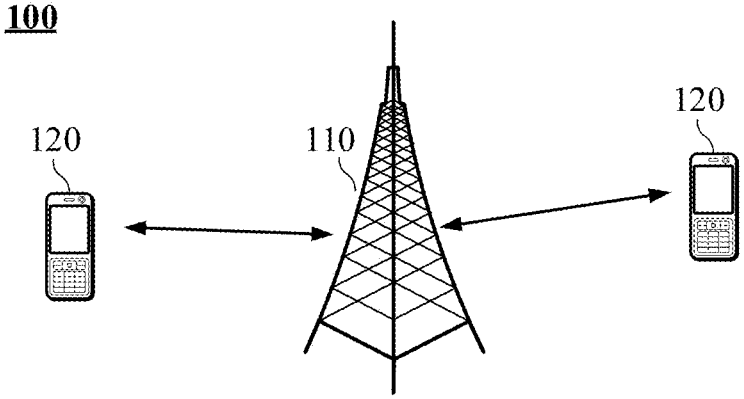
FIG. 1 is a schematic diagram of a wireless communication system according to an embodiment of the present application.

FIG. 1 illustrates a wireless communication system 100 applied in embodiments of the present application. The wireless communication system 100 may include a network device 110. The network device 110 may be a device that communicates with a terminal device. The network device 110 may provide communication coverage for a specific geographic area and communicate with terminal devices (for example, UEs) located within the coverage. Optionally, the network device 110 may be a BTS (Base Transceiver Station) in GSM (Global System for Mobile Communications) or CDMA (Code Division Multiple Access) system, an NB (NodeB) in a WCDMA (Wideband Code Division Multiple Access) system, an eNB or eNodeB (Evolutional Node B) in an LTE system, or a wireless controller in a CRAN (Cloud Radio Access Network). Alternatively, the network device may be a relay station, an access point, a vehicle-mounted device, a wearable device, a network device in a future 5G network, a network device in a future evolved PLMN (Public Land Mobile Network), or the like.

The wireless communication system 100 further includes at least one terminal device 120 located in the coverage of the network device 110. The terminal device 120 may be moving or stationary. Optionally, the terminal device 120 may be an access terminal, a UE (User Equipment), a user unit, a user station, a mobile radio station, a mobile station, a remote station, a remote terminal, a mobile device, a user terminal, a terminal, a wireless communication device, a user agent or a user device. An access terminal may be a cell phone, a cordless phone, an SIP (Session Initiation Protocol) phone, a WLL (Wireless Local Loop) station, a PDA (Personal Digital Assistant), a hand-held device with a wireless communication function, a computing device or other processing devices connected to a wireless modem, a vehicle-mounted device, a wearable device, a terminal device in a future 5G network, a terminal device in a future evolved PLMN (Public Land Mobile Network), or the like.

Optionally, Device to Device (D2D) communication may be carried out between the terminal devices 120.

Optionally, a 5G system or network may also be called as a NR (New Radio) system or network.

FIG. 1 exemplarily illustrates one network device and two terminal devices. Alternatively, the wireless communication system 100 may include multiple network devices, the coverage of each of which may cover other numbers of terminal devices. Embodiments of the present application do not have any limit on this.

Alternatively, the wireless communication system 100 may further include other network entities such as a network controller, a mobility management entity, and the like. Embodiments of the present application do not have any limit on this.

It should be understood that the terms "system" and "network" herein are exchangeable. The term "and/or" herein only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.

Figure 2:
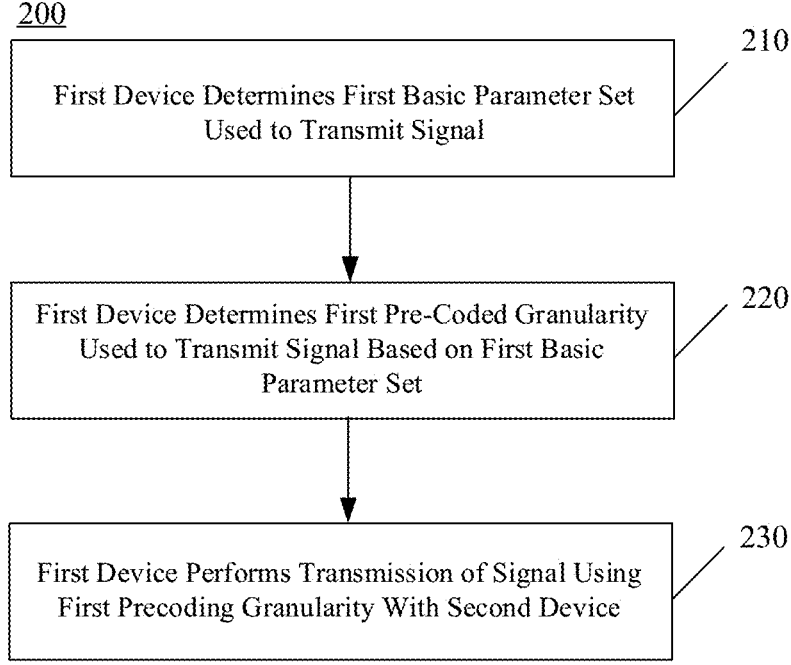
FIG. 2 is a schematic flow chart of a method of transmitting a signal according to an embodiment of the present application.

FIG. 2 is a schematic flow chart of a method of transmitting a signal 200 according to an embodiment of the present application. The method 200 is optionally applicable to the system shown in FIG. 1, but is not limited thereto. As shown in FIG. 2, the method 200 includes the following.

At 210, a first device determines a first numerology used to transmit a signal between with a second device.

Optionally, the first device is a terminal device, and the second device is a network device; or, the first device is a network device, and the second device is a terminal device.

Optionally, the signal may be an uplink signal from the terminal device to the network device. For example, it may be a signal carried by a Physical Uplink Shared Channel (PUSCH) or a Physical Uplink Control Channel (PUCCH).

Optionally, the signal may be a downlink signal from the network device to the terminal device. For example, it may be a signal carried by a Physical Downlink Shared Channel (PDSCH) or a Physical Downlink Control Channel (PDCCH).

Optionally, in an embodiment of the present application, both the first device and the second device may also be terminal devices.

Optionally, in an embodiment of the present application, a numerology includes at least one resource parameter for determining a time-frequency resource for transmitting a signal.

Optionally, in an embodiment of the present application, the numerology includes at least one of the following:

subcarrier spacing, that is, a frequency interval of adjacent subcarriers, for example, 15 kHz or 60 kHz;

number of subcarriers under a specific bandwidth, for example, number of subcarriers corresponding to each possible system bandwidth;

number of subcarriers included in a Physical Resource Block (PRB), for example, which may be an integer multiple of 6, 12 or 16;

length of an Orthogonal Frequency Division Multiplexing (OFDM) symbol;

number of points of Fast Fourier transform (FFT) or Inverse Fast Fourier transform (IFFT) used for generating an OFDM signal, for example, which may be an integer power of 2;

number of OFDM symbols included in a time unit, for example, which may be an integer multiple of 1, 2, 3, 4, 7 or 14;

number of time slots included in a time unit, for example, the number of time slots included in the time span of 1 ms or 10 ms;

length of a signal prefix, for example, the cyclic prefix used by a signal is a regular CP or an extended CP.

Optionally, in an embodiment of the present application, a first device may determine the first numerology used to perform transmission of a signal with the second device from a plurality of numerologies.

For example, in a New Radio (NR) system, multiple types of subcarrier spacings are introduced, and terminals may use different subcarrier spacings to transmit data. When requirement of transmission delay is relatively high, a larger subcarrier spacing and a larger bandwidth may be adopted to reduce transmission time and meet the requirement of delay.

At 220, the first device determines a first precoding granularity which is used to transmit the signal based on the first numerology.

Optionally, the first precoding granularity includes a time-domain precoding granularity and/or a frequency-domain precoding granularity.

Specifically, a precoding granularity is a minimum unit of a time-domain resource or a frequency-domain resource where the same precoding processing is used for transmitting a signal.

Optionally, in an embodiment of the present application, in a time resource corresponding to each of the time-domain precoding granularities, the same precoding processing is performed on signals. For example, a same precoding matrix is used to precode the signals.

Optionally, in an embodiment of the present application, in a frequency resource corresponding to each of the frequency-domain precoding granularities, the same precoding processing is performed on signals. For example, a same precoding matrix is used to precode the signals.

Optionally, the precoding granularity may be in units of PRBs, time slots or mini time slots.

Figure 3:
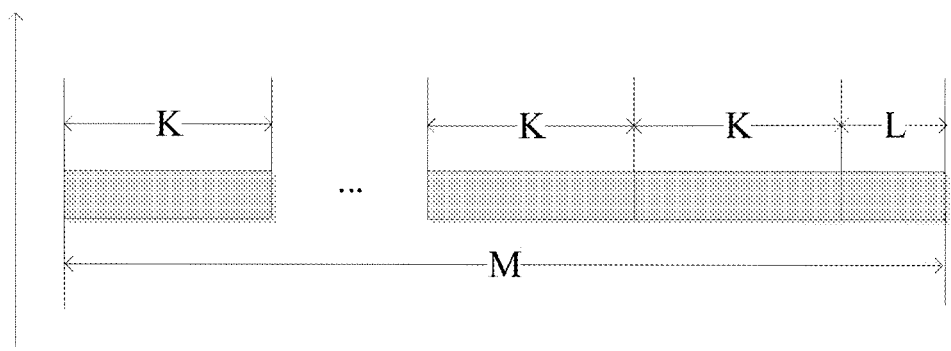
FIG. 3 is a schematic diagram of partitioning a resource based on a precoding granularity according to an embodiment of the present application.

For example, if a time-domain precoding granularity is N time slots or mini time slots, it indicates that a terminal may assume that a boundary of a subframe, or a radio frame, or a time-domain resource used to transmit the signal is used as a starting point. The precoding processing, which is used for the signal transmission in a set of time slots composed of every N time slots or mini time slots, is the same, but different precodings may be used between sets of time slots. For example, as shown in FIG. 3, one subframe or radio frame or a time-domain resource for transmitting the signal includes M slots, and the precoding granularity is K slots. The terminal device assumes that the same precoding processing is used for every K slots while different precoding processings may be used between two sets of time slots. If a radio frame, a subframe or a transmission time-domain resource can not be divided with no remainder by the precoding granularity, the same precoding is used for remaining time slots the number of which is less than K, for example, the L time slots as shown in FIG. 3.

Optionally, a precoding granularity is generally expressed in units of PRB.

Figure 4:
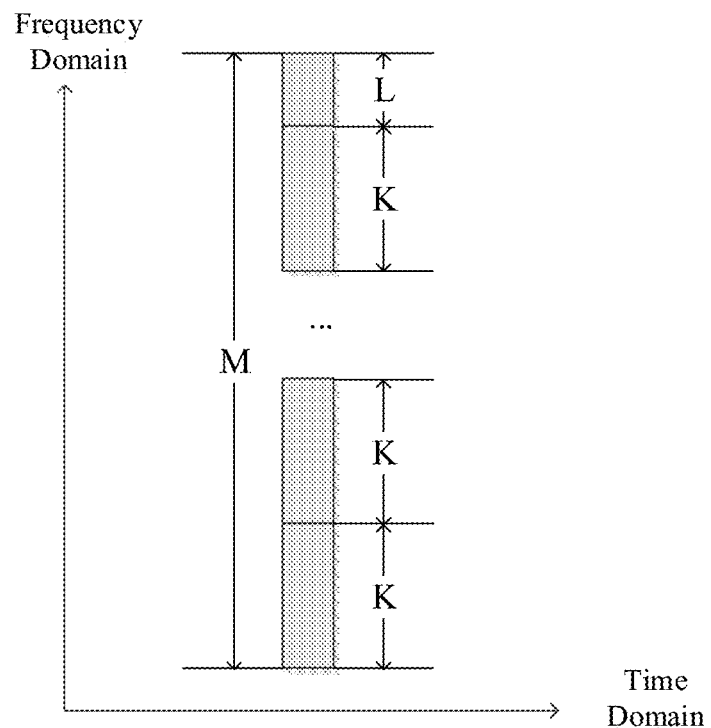
FIG. 4 is a schematic diagram of partitioning a resource based on a precoding granularity according to an embodiment of the present application.

For example, if the frequency-domain precoding granularity is N PRBs, a terminal device may assume that a boundary of a system bandwidth or a transmission bandwidth (for example, a frequency-domain resource occupied by the terminal or the network side to transmit the signal) is used as a starting point. The precoding processing, which is used for the signal transmission in a set of PRBs composed of every N PRBs, is the same, but different precodings may be used between sets of PRBs. As shown in FIG. 4, the system bandwidth or the transmission bandwidth includes M PRBs, and the precoding granularity is K. The terminal device uses a same precoding for every K PRBs while different precodings may be used between the two sets of K PRBs. When a system bandwidth or a transmission bandwidth of a terminal device can not be divided with no remainder by the precoding granularity, the same precoding processing is used for remaining PRBs the number of which is less than K, for example, the L PRBs described in FIG. 4.

For ease of understanding, several methods for determining the first precoding granularity will be described below, but the embodiments of the present application are not limited thereto.

In an implementation, the first precoding granularity is determined based on the first numerology and a first correspondence, wherein the first correspondence indicates an association between at least one numerology and at least one precoding granularity.

For example, if the numerology includes a subcarrier spacing, the first correspondence may be an association between the subcarrier spacing and the frequency-domain precoding granularity, which is shown in Table 1 below, for example.

TABLE 1

| Subcarrier spacing | Frequency-domain precoding granularity (number of PRBs) |
|---|---|
| 15 kHz | 4 |
| 30 kHz | 2 |
| 60 kHz | 1 |
| 120 kHz | 1 |

For another example, if the numerology includes a subcarrier spacing, the first correspondence may be an association between the subcarrier spacing and the time-domain precoding granularity, which is shown in Table 2 below, for example.

TABLE 2

| Subcarrier spacing | Time-domain precoding granularity (number of time slots) |
|---|---|
| 15 kHz | 1 |
| 30 kHz | 2 |
| 60 kHz | 4 |
| 120 kHz | 4 |

In an implementation, the first precoding granularity is determined based on a first bandwidth and the first numerology, wherein the first bandwidth is a system bandwidth or a bandwidth occupied for transmitting the signal.

Specifically, the first precoding granularity is determined based on the first numerology, the first bandwidth and a second correspondence, wherein the second correspondence indicates an association of at least one bandwidth, at least one numerology and at least one precoding granularity.

For example, if the numerology includes a subcarrier spacing, the second correspondence may be a correspondence of the subcarrier spacing, the bandwidth and the precoding granularity, which is shown in Table 3 below, for example.

TABLE 3

| System bandwidth (number of PRBs) | Subcarrier spacing | Frequency-domain precoding granularity (number of PRBs) |
|---|---|---|
| Less than or equal to 25 | 15 kHz | 2 |
| | 60 kHz | 1 |
| Greater than 25 and less than or equal to 50 | 15 kHz | 3 |
| | 60 kHz | 1 |
| Greater than 50 and less than or equal to 100 | 15 kHz | 4 |
| | 60 kHz | 1 |
| Greater than 100 | 15 kHz | 4 |
| | 60 kHz | 2 |

In an implementation, the first precoding granularity is determined based on a first frequency point and the first numerology, wherein the first frequency point is a frequency point occupied for transmitting the signal.

Specifically, the first precoding granularity is determined based on the first numerology, the first frequency point and a third correspondence, wherein the third correspondence indicates an association of at least one frequency point, at least one numerology and at least one precoding granularity.

Optionally, the foregoing correspondences (for example, the first correspondence, the second correspondence, or the third correspondence) may be pre-configured in the network device or the terminal device, for example, which may be preset at the factory, or may be preset through subscription information.

Alternatively, the foregoing correspondences may also be determined by the network device. In determining a precoding granularity, the network device may determine the precoding granularity based on the determined correspondence.

Optionally, after determining the correspondence, the network device may notify the terminal device of the foregoing correspondence through a downlink signaling. For example, the network side may notify the terminal device of the foregoing correspondence through a Radio Resource Control (RRC) signaling.

At 230, the first device performs transmission of the signal using the first precoding granularity with the second device.

Optionally, the signal is one from the first device to the second device; the first device performs a precoding processing on the signal in a resource corresponding to each of the first precoding granularities by a same precoding matrix, and transmits the signal after the precoding processing to the second device.

For example, the signal is an uplink signal, and the terminal device performs a precoding processing on the uplink signal transmitted in a region of each of time-domain or frequency-domain resources corresponding to the precoding granularity by a same precoding matrix, thereby transmitting the uplink signal. If a system bandwidth or a transmission bandwidth of the terminal device can not be divided with no remainder by the precoding granularity, the terminal device uses the same precoding for the uplink signal transmitted in the PRBs corresponding to the remainder of the bandwidth divided by the precoding granularity. For example, as shown in FIG. 4, the precoding granularity is K, and L=M mod K is the number of the remaining PRB.

Optionally, the signal is one from the second device to the first device; the first device receives the signal transmitted by the second device assuming that the signal in a resource corresponding to each of the first precoding granularities is pre-coded by a same precoding matrix.

In a specific implementation, when the terminal device performs a channel estimation based on DMRS, a frequency-domain (and/or time-domain) channel interpolation (e.g. the linear interpolation or the MMSE interpolation may be used) may be performed on the obtained channel estimation on some or all resources in a range of a frequency-domain (and/or time-domain) resources, thereby obtaining a channel estimation in the range of a frequency-domain (and/or time-domain) resources, and detecting the downlink signal based on the obtained channel estimation.

For example, if the frequency-domain precoding granularity is K PRBs, after obtaining channels on some Resource Elements (RE) based on the channel estimation of a reference signal, in a PRB set composed of every K PRBs, the terminal device may perform a channel interpolation between M PRBs in the PRB set based on these results of channel estimation, thereby obtaining channels on other REs in the M PRBs, wherein M is less than or equal to K.

For another example, if the time-domain precoding granularity is K time slots, after obtaining channels on some REs based on the channel estimation of a reference signal, in a set of time slots composed of every K time slots or mini time slots, the terminal device may perform a channel interpolation between M time slots or mini time slots in the set of M time slots or mini time slots based on these results of channel estimation, thereby obtaining channels on other REs in the M time slots or mini time slots, wherein M is less than or equal to K.

If a system bandwidth or a transmission bandwidth of a terminal device can not be divided with no remainder by the precoding granularity, the terminal assumes to use the same precoding processing for the downlink signal transmitted in the PRBs corresponding to the remainder of the bandwidth divided by the precoding granularity. For example, as shown in FIG. 4, the precoding granularity is K, and L=M mod K is the number of the remaining PRB.

Therefore, in embodiments of the present application, a first device determines a first precoding granularity used to transmit a signal based on a first numerology used to transmit the signal. As such, a precoding granularity matched with a numerology can be obtained and both the precoding gain and the performance of channel estimation can be taken into account.

Figure 5:
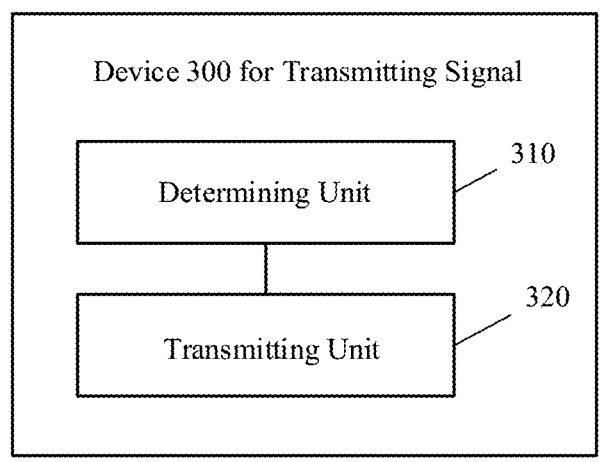
FIG. 5 is a schematic block diagram of a device for transmitting a signal according to an embodiment of the present application.

FIG. 5 is a schematic block diagram of a device 300 for transmitting a signal according to an embodiment of the present application. As shown in FIG. 5, the device 300 includes a determining unit 310 and a transmitting unit 320.

The determining unit 310 is configured to: determine a first numerology used to transmit a signal; and determine a first precoding granularity used to transmit the signal based on the first numerology; the transmitting unit 320 is configured to perform transmission of the signal with a second device using the first precoding granularity.

Optionally, the device 300 for transmitting a signal is a terminal device, and the second device is a network device; or
the device 300 for transmitting a signal is a network device, and the second device is a terminal device; or
the device 300 for transmitting a signal is a terminal device, and the second device is a terminal device.

Optionally, the first precoding granularity includes a time-domain precoding granularity and/or a frequency-domain precoding granularity.

Optionally, the determining unit 310 is further configured to:
determine the first precoding granularity based on the first numerology and a first correspondence, wherein the first correspondence indicates an association between at least one numerology and at least one precoding granularity.

Optionally, the device 300 for transmitting a signal is a terminal device, and the first correspondence is a correspondence preset on the terminal device, or a correspondence transmitted by the network device to the terminal device; or
the device 300 for transmitting a signal is a network device, and the first correspondence is a preset correspondence on the network device, or a correspondence determined by the network device.

Optionally, the determining unit 310 is further configured to:
determine the first precoding granularity based on a first bandwidth and the first numerology, wherein the first bandwidth is a system bandwidth or a bandwidth occupied for transmitting the signal.

Optionally, the determining unit 310 is further configured to:
determine the first precoding granularity based on the first numerology, the first bandwidth and a second correspondence, wherein the second correspondence indicates an association of at least one bandwidth, at least one numerology and at least one precoding granularity.

Optionally, the device 300 for transmitting a signal is a terminal device, and the second correspondence is a correspondence preset on the terminal device, or a correspondence transmitted by the network device to the terminal device; or the device 300 for transmitting a signal is a network device, and the second correspondence is a preset correspondence on the network device, or a correspondence determined by the network device.

Optionally, the determining unit 310 is further configured to:

determine the first precoding granularity based on a first frequency point and the first numerology, wherein the first frequency point is a frequency point occupied for transmitting the signal.

Optionally, the determining unit 310 is further configured to:

determine the first precoding granularity based on the first numerology, the first frequency point and a third correspondence, wherein the third correspondence indicates an association of at least one frequency point, at least one numerology and at least one precoding granularity.

Optionally, the device 300 for transmitting a signal is a terminal device, and the third correspondence is a correspondence preset on the terminal device, or a correspondence transmitted by the network device to the terminal device; or the device 300 for transmitting a signal is a network device, and the third correspondence is a preset correspondence on the network device, or a correspondence determined by the network device.

Optionally, the signal is one from the device 300 for transmitting a signal to the second device;
the transmitting unit 320 is further configured to:
perform precoding processing on a signal carried by a resource corresponding to each of the first precoding granularities by a same precoding matrix;
transmitting the signal after the precoding processing to the second device.

Optionally, the signal is one from the second device to the device 300 for transmitting a signal;
the transmitting unit 320 is further configured to:
receive the signal transmitted by the second device assuming that a signal carried by a resource corresponding to each of the first precoding granularities is pre-coded by a same precoding matrix.

Optionally, the first numerology includes at least one of the following:
subcarrier spacing;
number of subcarriers under a specific bandwidth;
number of subcarriers included in a Physical Resource Block (PRB);
length of an Orthogonal Frequency Division Multiplexing (OFDM) symbol;
number of points of Fast Fourier transform (FFT) or Inverse Fast Fourier transform (IFFT) used for generating an OFDM signal;
number of OFDM symbols included in a time unit;
number of time slots included in a time unit;
length of a signal prefix.

It should be understood that the device 300 for transmitting a signal may be corresponding to the terminal device in the method 200 shown in FIG. 2 and may implement corresponding functions of the terminal device. For brevity, it will not be described again herein.

Figure 6:
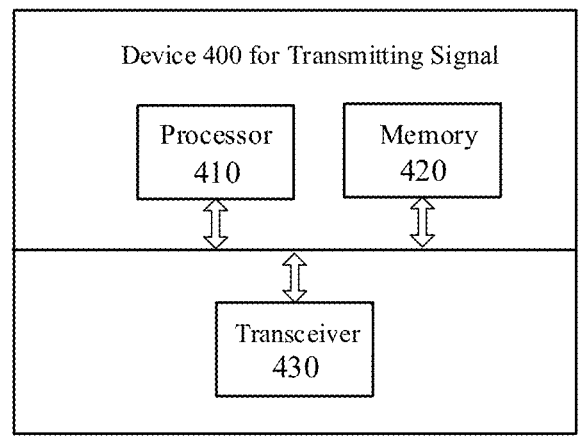
FIG. 6 is a schematic block diagram of a device for transmitting a signal according to an embodiment of the present application.

FIG. 6 is a schematic block diagram of a device 400 for transmitting a signal according to an embodiment of the present application. As shown in FIG. 6, the device 400 includes a processor 410 and a memory 420. The memory 420 may store a program code, and the processor 410 may execute the program code stored in the memory 420.

Optionally, as shown in FIG. 6, the device 400 may include a transceiver 430, and the processor 410 may control the transceiver 430 to communicate with the exterior.

Optionally, the processor 410 may invoke the program code stored in the memory 420 to perform the corresponding operations of the first device in the method 200 shown in FIG. 2. For brevity, it will not be described again herein.

Figure 7:
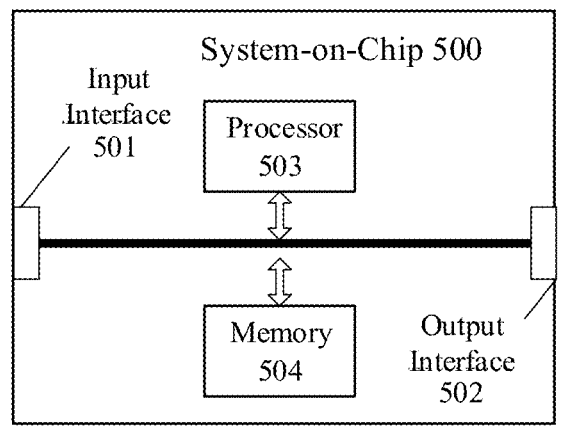
FIG. 7 is a schematic block diagram of a system-on-chip according to an embodiment of the present application.

FIG. 7 is a schematic structure diagram of a system-on-chip of an embodiment of the present application. The system-on-chip 500 of FIG. 7 includes an input interface 501, an output interface 502, wherein the processor 503 and the memory 504 are connected via communication connection, and the processor 503 is configured to execute a code in the memory 504.

Optionally, when the code is executed, the processor 503 implements the method performed by the first device in the method 200 shown in FIG. 2. For brevity, it will not be described again herein.

It may be appreciated by an ordinary person skilled in the art that various units and algorithm steps of various examples described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present application.

In addition, all functional units in the embodiments of the present application may be integrated into one processing unit. Or, each unit exists independently in physics. Or, two or more units may be integrated into one unit.

The functional units, if implemented in the form of the software functional unit and sold or used as a standalone product, may be stored in a computer-readable storage medium. Based on such an understanding, the technical solution of the present application in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present application. The foregoing storage medium includes various media that may store program codes, such as a USB flash disk, a mobile hard disk, a read-only memory (ROM), a random access memory (RAM), a magnetic disk, an optical disk, or the like.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

The invention claimed is:

1. A method of transmitting a signal, comprising:
   determining, by a first device, a first numerology used to transmit a signal;
   determining, by the first device, a first precoding granularity which is used to transmit the signal based on the first numerology; and
   performing, by the first device, communication of the signal with a second device using the first precoding granularity,
   wherein determining, by the first device, the first precoding granularity which is used to transmit the signal based on the first numerology, further comprises:
      determining the first precoding granularity based on a first bandwidth and the first numerology,
      wherein the first bandwidth is a system bandwidth or a bandwidth occupied for transmitting the signal; and
      wherein determining the first precoding granularity based on a first bandwidth and the first numerology, comprises:
         determining the first precoding granularity based on the first numerology, the first bandwidth and a second correspondence,
            wherein the second correspondence indicates an association of at least one bandwidth, at least one numerology and at least one precoding granularity.

2. The method of claim 1, wherein the first precoding granularity comprises at least one of the following: a time-domain precoding granularity; and a frequency-domain precoding granularity.

3. The method of claim 1, wherein determining, by the first device, the first precoding granularity which is used to transmit the signal based on the first numerology, comprises:
   determining the first precoding granularity based on the first numerology and a first correspondence, wherein the first correspondence indicates an association between at least one numerology and at least one precoding granularity.

4. The method of claim 1, wherein determining, by the first device, the first precoding granularity which is used to transmit the signal based on the first numerology, further comprises:
   determining the first precoding granularity based on a first frequency point and the first numerology, wherein the first frequency point is a frequency point for transmitting the signal.

5. The method of claim 4, wherein, determining the first precoding granularity based on the first frequency point and the first numerology, comprises:
   determining the first precoding granularity based on the first numerology, the first frequency point and a third correspondence,
      wherein the third correspondence indicates an association of at least one frequency point, at least one numerology and at least one precoding granularity.

6. The method of claim 1, wherein the signal is transmitted from the first device to the second device;
   performing, by the first device, transmission of the signal with a second device using the first precoding granularity comprises:
      performing, by the first device, precoding processing on a signal carried by a resource corresponding to the first precoding granularities by a same precoding matrix;
      transmitting the signal after the precoding processing to the second device.

7. The method of claim 1, wherein the signal is transmitted from the second device to the first device;
   wherein performing, by the first device, transmission of the signal with a second device using the first precoding granularity comprises:
      receiving, by the first device, the signal transmitted by the second device assuming that a signal carried by a resource corresponding to the first precoding granularities is pre-coded by a same precoding matrix.

8. The method of claim 1, wherein the first numerology comprises at least one of:
   subcarrier spacing;
   number of subcarriers under a specific bandwidth;
   number of subcarriers included in a Physical Resource Block (PRB);
   length of an Orthogonal Frequency Division Multiplexing (OFDM) symbol;
   number of points of Fast Fourier transform (FFT) or Inverse Fast Fourier transform (IFFT) used for generating an OFDM signal;
   number of OFDM symbols included in a time unit;
   number of time slots included in a time unit;
   length of a signal prefix.

9. A device for transmitting a signal comprising;
   a memory and
   a processor, wherein the memory stores instructions, and the processor is configured to invoke the instructions stored in the memory to perform processing of a first device in a method of transmitting a signal which comprises:
      determining a first numerology used to transmit a signal;
      determining a first precoding granularity which is used to transmit the signal based on the first numerology;
      performing communication of the signal with a second device using the first precoding granularity,
      wherein determining the first precoding granularity which is used to transmit the signal based on the first numerology further comprises:
         determining the first precoding granularity based on a first bandwidth and the first numerology, wherein the first bandwidth is a system bandwidth or a bandwidth occupied for transmitting the signal, and wherein determining the first precoding granularity based on a first bandwidth and the first numerology comprises:
determining the first precoding granularity based on the first numerology, the first bandwidth and a second correspondence,
wherein the second correspondence indicates an association of at least one bandwidth, at least one numerology and at least one precoding granularity.

10. The device of claim 9, wherein the first precoding granularity comprises a time-domain precoding granularity and/or a frequency-domain precoding granularity.

11. The device of claim 9, wherein the first numerology comprises at least one of:
subcarrier spacing;
number of subcarriers under a specific bandwidth;
number of subcarriers included in a Physical Resource Block (PRB);
length of an Orthogonal Frequency Division Multiplexing (OFDM) symbol;
number of points of Fast Fourier transform (FFT) or Inverse Fast Fourier transform (IFFT) used for generating an OFDM signal;
number of OFDM symbols included in a time unit;
number of time slots included in a time unit;
length of a signal prefix.

12. The device of claim 9, wherein determining the first precoding granularity which is used to transmit the signal based on the first numerology comprises:
determining the first precoding granularity based on the first numerology and a first correspondence, wherein the first correspondence indicates an association between at least one numerology and at least one precoding granularity.

13. The device of claim 9, wherein determining the first precoding granularity which is used to transmit the signal based on the first numerology further comprises:
determining the first precoding granularity based on a first frequency point and the first numerology, wherein the first frequency point is a frequency point occupied for transmitting the signal.

14. The method of claim 13, determining the first precoding granularity based on a first frequency point and the first numerology comprises:
determining the first precoding granularity based on the first numerology, the first frequency point and a third correspondence, wherein the third correspondence indicates an association of at least one frequency point, at least one numerology and at least one precoding granularity.

15. The device of claim 9, wherein the signal is transmitted from the first device to the second device;
performing transmission of the signal with a second device using the first precoding granularity comprises:
performing precoding processing on a signal carried by a resource corresponding to the first precoding granularities by a same precoding matrix;
transmitting the signal after the precoding processing to the second device.

* * * * *